United States Patent [19]
Obrecht

[11] 4,082,324
[45] Apr. 4, 1978

[54] CONNECTION ARRANGEMENT FOR MANIFOLD BLOCKS

[76] Inventor: Robert E. Obrecht, 805 Stephenson Hwy., Royal Oak, Mich. 48067

[21] Appl. No.: 729,193

[22] Filed: Oct. 4, 1976

[51] Int. Cl.² .............................................. F16L 39/00
[52] U.S. Cl. ................................ 285/137 R; 285/364; 137/271; 403/309; 403/338
[58] Field of Search ................... 285/137 R, 364, 367, 285/406; 403/338, 300, 309, 310; 137/271

[56] References Cited

U.S. PATENT DOCUMENTS

| | | | |
|---|---|---|---|
| 3,390,901 | 7/1968 | Bibb | 285/406 |
| 3,574,862 | 4/1971 | Jones | 285/367 |
| 3,879,068 | 4/1975 | Stampfli | 285/406 X |

FOREIGN PATENT DOCUMENTS

| | | | |
|---|---|---|---|
| 861,335 | 10/1940 | France | 285/406 |
| 1,346,620 | 11/1963 | France | 285/367 |
| 1,225,882 | 2/1960 | France | 285/364 |

*Primary Examiner*—Andrew V. Kundrat
*Attorney, Agent, or Firm*—Krass & Young

[57] ABSTRACT

An arrangement is disclosed for securing together mating faces of hydraulic manifold blocks so as to securely seal aligned ports on the mating faces, the arrangement consisting of a slot having a sloping sidewall formed in each side of the manifold blocks adjacent to the mating surfaces, and includes respective clamping elements having contours adapted to engage the sloping sidewalls of slot pairs brought into juxtaposition when manifold block pairs are placed in position with the mating faces abutting each other. The clamping elements are drawn into the slots by means of threaded fasteners passing through the clamping element and mating position with respect to each other received in threaded bores in the respective manifold blocks, the interaction between the sloping slot and clamping element contours being such that the mating manifold faces are drawn tightly together.

8 Claims, 3 Drawing Figures

U.S. Patent    April 4, 1978    4,082,324
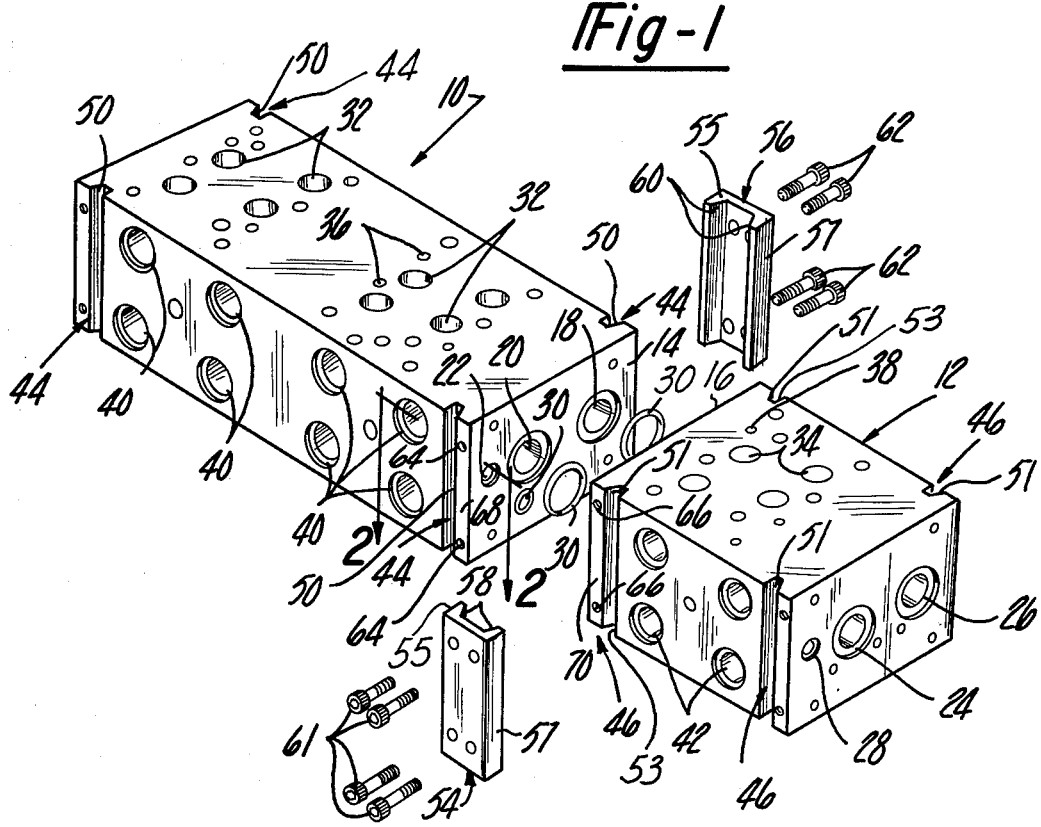
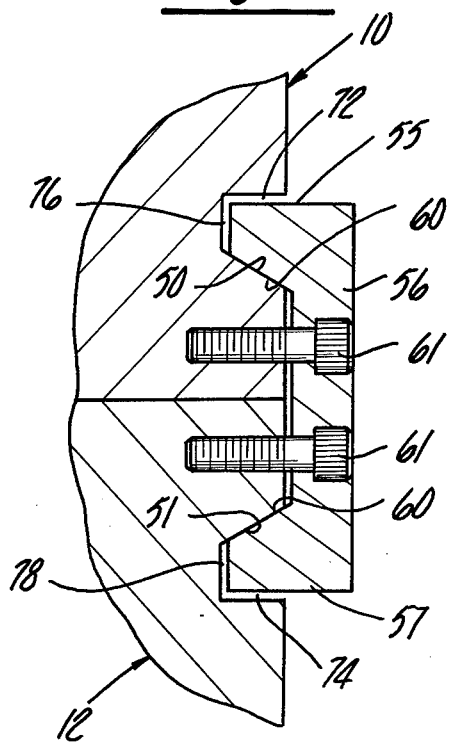

CONNECTION ARRANGEMENT FOR MANIFOLD BLOCKS

BACKGROUND OF THE INVENTION

1. Field of the Invention

This invention concerns fluid pressure connections and more particularly arrangements for connecting together modular or stackable manifold units having mating planar surfaces in which are formed fluid pressure parts which must be sealed by the mating engagement.

2. Description of the Prior Art

In providing hydraulic equipment of a complicated nature such as are utilized in machine tool and transfer line applications, it is desirable to have the capability for making modifications to existing designs or machines to provide additional hydraulic cylinders, way units, etc. at a given point. In recent years the great advantages accruing from an ability to add such hydraulic equipment to existing machines or designs by the use of modular or stackable manifold units have become recognized. In these arrangements, the hydraulic supply lines from the hydraulic pressure source is connected via manifold units, which receive the pressure return and supply lines from the hydraulic pressure source and via internal passages provides appropriate ports for connections to the associated control valves and ports for connection to the hydraulic device. These manifolds are adapted to be "stacked" by virtue of a capability for securing together mating faces of one or more of such manifold units. By having openings on the mating face aligned with the pressure return and supply lines, and by merely adding a manifold unit, all of the connections necessary to add one or more of such hydraulic devices and valving can be carried out by simply fastening an additional manifold unit to the existing manifold unit and installing the valve and actuator device by connections to the manifold unit. Since most of the fluid pressure connections are via internal passages in the manifold block, installation is greatly simplified, and the number of hydraulic connection seals, lines, etc., is considerably reduced. The incidence of leakage thus would also be considerably reduced, in turn improving the reliability of the equipment and reducing down time as well as maintenance cost.

However, a convenient and effective means for securing together the mating faces of adjacent manifold blocks has not heretofore been provided. Current approaches include the use of long tie rod bolts passing through openings extending through all of the stacked manifold block members, which would then be drawn together by tightening cooperating threaded nuts, engaging each of the long bolt members. This approach necessitates the use of tie rod members of different lengths, since the connection would require replacement of existing tie rods as additional manifold blocks are added to the assembly.

Furthermore, the bolt members are stressed in tension and in hydraulic units considerable pressure may be exerted tending to stretch the bolt members, and reducing the reliability of the sealing between blocks produced by the tie rod especially in applications in which the tie rods are quite long in order to accomodate the length of the stack manifold blocks.

Other approaches involve the use of flanges machined or otherwise formed into the sides of the manifold blocks adjacent the mating surfaces, with relatively short bolts passing through aligned openings of the bolts in the abutting flanges. This approach, likewise, involves stressing in tension and bending of the flanges, and since the manifold assemblies are typically fabricated from aluminum, the stiffness of the flanges may not be adaquate to ensure reliable sealing. Also, the accessibility of such bolts for assembly is not optimal since they extend adjacent side surfaces of the manifold block. Furthermore, the flanges may add significantly to the fabrication expenses involved, since extensive milling operations are usually required to form the flanges integral with the manifold blocks.

Other arrangements have included dove-tailing surfaces formed on the manifold blocks but this approach does not provide an adequate force tending to draw together the mating faces to produce a good seal and are accordingly not appropriate for hydraulic applications involving substantial pressures which must be completely sealed.

Similarly, arrangements have been provided in which spring clips are adapted to draw together the mating surfaces, but these forces are, likewise inadequate for proper sealing for all but a few of the applications for such equipment.

It is therefore an object of the present invention to provide a connection arrangement to secure together mating faces of such manifold blocks, which provides adequate sealing pressure between the mating faces, capable of resisting relatively great separation pressures.

It is a further object of the present invention to provide such a connection means which does not involve the use of connector elements unique to the sizing of the manifold units or the number of units interconnected together.

It is yet another object of the present invention to provide such a connection arrangement which does not involve extensive machining or complex structural features on the manifold bodies.

Finally, it is an object of the present invention to provide such a connection arrangement which is relatively convenient to install such, as to be easily and simply assembled by the machine builder.

SUMMARY OF THE INVENTION

These and other objects which will become apparent upon a reading of the following specification and claims is carried out by a connection arrangement involving elongated slots formed in the side portion of each of the manifold blocks adjacent the mating faces of the manifold blocks, each of which slots having a sloping side surface, with corresponding clamp element provided adapted to be received into the slot pairs which are positioned juxtaposed each other upon positioning of the manifold blocks in a mating relationship. Each clamping element has a sloping surface formed to cooperate with the sloping slot contours to act to draw together the manifold blocks upon drawing of the clamping element towards the manifold blocks by virtue of a plurality of threaded fasteners passing through the clamping elements and into threaded bores formed in the manifold blocks.

DESCRIPTION OF THE DRAWING

FIG. 1 is a exploded perspective view of a pair of manifold blocks adapted to be joined together with the connection arrangement according to the present invention;

FIG. 2 is a sectional view 2—2 taken in FIG. 1; and

FIG. 3 is a fragmentary sectional view of a pair of manifold blocks joined together with a connection according to the present invention.

DETAILED DESCRIPTION

In the following detailed description specific terminology will be utilized for the sake of clarity and a particular environment described in accordance with 35 USC 112 but it is to be understood that the same is not to be construed in a limiting sense but is merely illustrative inasmuch as the concept is susceptible of a wide variety of forms and embodiments.

Referring to the drawings, the pair of stackable hydraulic manifold blocks 10 and 12 are shown in a separated position. Each of the manifold blocks 10 and 12 are generally rectangular in section having end surfaces 14 and 16 which are adapted to be positioned together in a mating relationship. Each of the end surfaces 14 and 16 has port openings, 18, 20, 22, 24, 26 and 28, which are adapted to be aligned with each other and provide a fluid connection therebetween. O-rings 30 are provided in appropriate recesses formed in the port circumferences such that upon drawing together of the respective end surfaces 14 and 16 a hydraulic seal is provided. Typically the ports 24 and 26 would be connected to pressure and return connections from a hydraulic power source while port 28 would provide a sump connection in which bypass or leakage flow would be returned to the hydraulic power source sump (not shown). The internal passages connected to ports 18, 20, 22, 24, 26, and 28 via internal passages formed in each of the manifold blocks 10 and 12 provide appropriate fluid pressure connections with surface openings 32 and 34 respectively such as would mate with corresponding openings on a four way valve body to be installed on the upper surface thereof, with tapped mounting holes 36 and 38 provided for this purpose. Typically, the openings for connections to the hydraulic devices such as hydraulic cylinders by the four way valves to be operated would be provided in the side surface of the manifold blocks at 40 and 42 respectively.

This arrangement of ports is of course merely exemplary inasmuch as the manifold blocks may be adapted to a great variety of applications.

The manifold block connection arrangement according to the present invention consists of a plurality of elongated slots 44 and 46 machined into the respective manifold block sides 10 and 12 adjacent to the mating end surfaces 14 and 16 respectively, as can be seen by reference to FIG. 2. Each of the slots 44 and 46 includes a sloping side surface 50 and 51 respectively which extends transversely to the plane defined by the mating end surface 14 and inclined towards the plane defined by the end surface 14. The opposite sides 52 and 53 of the slots 44 and 46 respectively are straight sided and extend normally to the side surface formed in the block 10. Upon positioning of the mating end surfaces 14 and 16 in abutting relationship, respective pairs of the slots of 44 and 46 are thereby juxtaposed to each other and respective channel-shaped clamping elements 54 and 56 including sidewalls 55, 57, each of which has inner sloping cam surfaces 60 respectively are positioned so as to be adapted to mate with the sloping surfaces 50 and 51 respectively this creates a wedging action such as to force together the mating end faces 14 and 16 upon drawing of the clamping elements 54 and 56 respectively into the juxtaposed slots 44 and 46 as shown in FIG. 3. The clamping elements 54 and 56 are drawn into the juxtaposed slots 44 and 46 by a plurality of threaded fasteners 61 and 62 passing through the clamping elements 54 and 56 respectively and into threaded bores 64 and 66 respectively, machined into flat surfaces 68 and 70 respectively, intermediate the slots 44 and 46 and the end surface 14 and 16, so that upon installation the clamping elements 54 and 56 are drawn into the respective slots 44 and 46 to in turn draw the end faces 14 and 16 into very secure sealing relationship with respect to each other.

As seen in FIG. 3 clearance spaces at 72, 74, 76 and 78 at the sides and bottoms respectively of the slots 44 and 46 are provided so as to allow advancing movement of each of the clamping elements 54 and 56 into the slots 44 and 46 without interference with the sides or bottoms of the respective grooves to allow full tightening to take place. The clamping elements 54 and 56 may advantageously be fabricated from a steel alloy having sufficient strength for the particular application. Additional manifold blocks could be added more or less indefinitely by applying the clamping elements for each of the respective joined manifold blocks with the first manifold unit in the series having appropriate connections to the hydraulic power unit and the last having end ports appropriately plugged. It can thus be seen that this arrangement substantially achieves the object of the present invention. The wedging action produced between the sloping side surfaces of the clamping element and the juxtaposed slots produces relatively great sealing forces acting to force together the end surfaces by virtue of the mechanical advantage afforded by the wedging interaction. At the same time the threaded fasteners used to produce the securement of the clamping elements to the manifold blocks are not subjected to tensile forces of the same magnitude as the compressive forces exerted between the faces by virtue of this mechanical advantage. The hydraulically induced separating forces likewise do not induce such tensile forces thereon. Furthermore, the sections of the respective manifold blocks which typically are of aluminum, are not subjected to deflecting forces as result of the engagement of the clamping elements. The sections of the manifold blocks subject to exertion of the hydraulic separation forces are relatively large and accordingly are quite stiff, such that significant deflection thereof tending to cause leakage at the interface is avoided. The clamping elements themselves being separate elements can thus be made of high strength steel alloy such that the deflection of that element may thereby be minimized.

It may also be seen that this connection arrangement is relatively inexpensive inasmuch as the slots may be simply milled into the side surfaces and the clamping elements machined or otherwise fabricated from bar stock.

Since the fasteners used to secure the clamping elements to the manifold blocks extend into the manifold blocks normally to the side surfaces, they are readily accessible for assembly purposes simplifying this task.

In addition the configuration of the clamping elements does not vary with the number or linear size of the interconnected manifold blocks and as such can be standardized for a given series of manifold block sizings to simplify stockings of parts etc. as well as to reduce their manufacturing cost.

The embodiments of the invention in which an exclusive property or privilege is claimed are defined as follows:

1. A connection arrangement for securing together manifold blocks having mating end surfaces, the arrangement comprising: a slot formed on each side surface of each of said manifold blocks adjacent said mating end surfaces, each of said slots having a sloping side surface extending transversely to the respective mating end surface and inclined towards said mating end surface; a pair of clamping elements each having a surface formed thereon adapted to mate with slot pairs juxtaposed when said manifold blocks are positioned with said mating end surfaces in abutting relationship; means for drawing each of said clamping elements into engagement with said mating sloping side wall surfaces formed on said slot pairs, whereby said mating end surfaces are drawn into sealing engagement with one another and wherein said manifold blocks have formed therein flat surfaces intermediate said slots and said planar mating surfaces, and threaded bores are formed in said flat surfaces.

2. The connection arrangement according to claim 1 wherein said clamping elements comprise channel shaped elements with sidewalls each being configured with straight sided outer surfaces and opposing sloping inner surfaces adapted to mate with said sloping slot side wall surfaces.

3. The connection arrangement according to claim 2 wherein said means drawing said clamping elements into engagement with said sloping slot side wall surfaces comprises a plurality of threaded fasteners extending through said clamping elements and received within said threaded bores in said manifold blocks.

4. The connection arrangement according to claim 1 wherein said manifold blocks are fomed from aluminum and said clamping elements are formed of steel.

5. A stacked manifold assembly comprising: a first and second manifold block, each manifold block generally rectangular in section and having abutting end faces each formed with port openings formed therein aligned with respect to each other; a pair of elongated slots formed in said manifold blocks on a side surface adjacent said end faces, each of said slots having a sloping side wall surface extending transversely to the plane of said abutting end surfaces and extending towards said end surface; a pair of clamping elements one each engaging respective slot pairs juxtaposed to each other with said manifold blocks positioned with said end surfaces in abutting relationship with each other.

6. The assembly according to claim 5 wherein said clamping elements comprise channel shaped elements with sidewalls each being configured with straight sided outer surface and opposing sloping inner surfaces adapted to mate with said sloping slot side wall surfaces and wherein said manifold blocks have formed therein flat surfaces intermediate said slots and said abutting end surfaces, and wherein threaded bores are formed in said flat surfaces.

7. The assembly according to claim 6 wherein said means drawing said clamping elements into engagement with said sloping slot side wall surfaces comprises a plurality of threaded fasteners extending through said clamping elements and received within said threaded bores in said manifold blocks.

8. The assembly according to claim 5 wherein said manifold blocks are formed from aluminum and said clamping elements are formed of steel.

* * * * *